United States Patent
Williams et al.

(10) Patent No.: US 11,280,042 B2
(45) Date of Patent: Mar. 22, 2022

(54) APPARATUS, SYSTEM, AND METHOD OF PROVIDING A LIQUID LEVEL MONITOR

(71) Applicants: Amanda Williams, St. Petersburg, FL (US); Julio Danel Oropeza, St. Petersburg, FL (US); Yu-Chang Lee, St. Petersburg, FL (US); Ying Hao Lee, St. Petersburg, FL (US); Martin Johnson, St. Petersburg, FL (US); Marc Theeuwes, St. Petersburg, FL (US); Stefan Vaes, St. Petersburg, FL (US); Toon Diels, St. Petersburg, FL (US)

(72) Inventors: Amanda Williams, St. Petersburg, FL (US); Julio Danel Oropeza, St. Petersburg, FL (US); Yu-Chang Lee, St. Petersburg, FL (US); Ying Hao Lee, St. Petersburg, FL (US); Martin Johnson, St. Petersburg, FL (US); Marc Theeuwes, St. Petersburg, FL (US); Stefan Vaes, St. Petersburg, FL (US); Toon Diels, St. Petersburg, FL (US)

(73) Assignee: NYPRO INC., Clinton, MA (US)

( * ) Notice: Subject to any disclaimer, the term of this patent is extended or adjusted under 35 U.S.C. 154(b) by 0 days.

(21) Appl. No.: 15/970,795

(22) Filed: May 3, 2018

(65) Prior Publication Data
US 2018/0321072 A1  Nov. 8, 2018

Related U.S. Application Data

(60) Provisional application No. 62/500,916, filed on May 3, 2017, provisional application No. 62/592,955, filed
(Continued)

(51) Int. Cl.
*D06F 39/02* (2006.01)
*G01F 23/00* (2006.01)
(Continued)

(52) U.S. Cl.
CPC .......... *D06F 39/022* (2013.01); *A47L 15/449* (2013.01); *A47L 15/4418* (2013.01);
(Continued)

(58) Field of Classification Search
CPC .. G01F 23/0076; G01F 23/0007; G01F 23/00; A47L 15/4418; A47L 15/4463;
(Continued)

(56) References Cited

U.S. PATENT DOCUMENTS 1,078,214 A * 11/1913 Patnaude ...................... 222/129
4,874,023 A * 10/1989 Ulm ..................... B67D 3/0019
141/346

(Continued)

FOREIGN PATENT DOCUMENTS

EP    2180299 A1    4/2010

OTHER PUBLICATIONS

International Search Report and Written Opinion dated Aug. 27, 2018 in PCT/US2018/030987.
(Continued)

*Primary Examiner* — Paul R Durand
*Assistant Examiner* — Michael J. Melaragno
(74) *Attorney, Agent, or Firm* — Thomas J. McWilliams; Barnes & Thornburg LLP

(57) ABSTRACT

The embodiments are and include an apparatus, system and method for a liquid level monitoring dispenser for association with a liquid filled consumable. The apparatus, system and method may include: a receiver for receiving the consumable upon inversion thereof; at least one electrical contact within the receiver for communicative association
(Continued)

with conductive strips on the consumable; a sensing module communicative with the at least one electrical contact and having associated therewith firmware for converting signals associated with the conductive strips and received at the electrical contact to an indication of the liquid level; a communications module for communicating the liquid level to at least a user display and over at least one network; a power module for powering at least the sensing module and the communications module; and at least one dispensing output in fluid communication with the consumable and capable of dispensing the liquid from the consumable to modify the liquid level.

19 Claims, 13 Drawing Sheets

Related U.S. Application Data on Nov. 30, 2017, provisional application No. 62/666,605, filed on May 3, 2018, provisional application No. 62/666,608, filed on May 3, 2018.

(51) Int. Cl.

| A47L 15/44 | (2006.01) |
|---|---|
| B67D 3/00 | (2006.01) |
| B65D 83/00 | (2006.01) |
| B60K 15/00 | (2006.01) |
| D06F 105/60 | (2020.01) |
| D06F 33/37 | (2020.01) |

(52) U.S. Cl.
CPC .......... *A47L 15/4463* (2013.01); *B60K 15/00* (2013.01); *B65D 83/00* (2013.01); *B67D 3/0077* (2013.01); *B67D 3/0093* (2013.01); *G01F 23/0007* (2013.01); *G01F 23/0076* (2013.01); *D06F 33/37* (2020.02); *D06F 2105/60* (2020.02); *G01F 23/00* (2013.01)

(58) Field of Classification Search
CPC ....... A47L 15/449; B60K 15/00; B65D 83/00; B67D 3/00; B67D 3/0077; B67D 3/0093; B67D 3/0074; B67D 3/0006; B67D 3/008; B67D 3/0083; B67D 3/0054; B67D 3/0035
USPC .......................................... 222/64, 185.1, 325
See application file for complete search history.

(56) References Cited

U.S. PATENT DOCUMENTS

| 4,991,635 | A * | 2/1991 | Ulm .................... B67D 3/0019 141/286 |
|---|---|---|---|
| 5,005,407 | A * | 4/1991 | Koon .................... G01F 23/266 340/620 |
| 5,213,597 | A * | 5/1993 | Campbell ............. B67D 3/0029 141/18 |
| 5,368,197 | A * | 11/1994 | Sutera ..................... B67D 3/00 222/185.1 |
| 5,383,574 | A * | 1/1995 | Raphael ............... B67D 1/1245 137/205 |
| 5,636,762 | A * | 6/1997 | Juhola .................. B67D 1/1245 137/205 |
| 5,641,006 | A * | 6/1997 | Autrey ................ A47L 15/4418 137/101.19 |
| 6,095,370 | A * | 8/2000 | Rhine ........................ B67D 7/02 222/1 |
| 6,554,382 | B1 * | 4/2003 | Sleger .................. B41J 2/17513 347/19 |
| 6,741,180 | B2 * | 5/2004 | Lassota .................. A47J 31/50 340/618 |
| 6,820,772 | B1 * | 11/2004 | Bennett, Jr. ............ B67D 3/048 222/185.1 |
| 7,000,468 | B2 * | 2/2006 | Doorhy .................. G01F 23/18 73/299 |
| 7,258,005 | B2 * | 8/2007 | Nyce ..................... G01F 23/263 73/304 C |
| 7,331,487 | B2 * | 2/2008 | Macler, II ................. B67B 7/28 222/105 |
| 7,401,513 | B2 * | 7/2008 | Szela .................... G01F 23/266 73/304 C |
| 7,506,576 | B1 * | 3/2009 | Lassota .................. A47J 31/52 99/280 |
| 7,562,571 | B2 * | 7/2009 | Raffalt .................... G01F 23/00 73/313 |
| 7,654,421 | B2 * | 2/2010 | Chan ................... A47L 15/4454 222/651 |
| 7,661,307 | B1 * | 2/2010 | Milone ................... G01F 23/18 73/290 R |
| 7,712,364 | B2 * | 5/2010 | Radhakrishnan ....... A47J 31/50 73/304 C |
| 7,798,373 | B1 * | 9/2010 | Wroblewski ........... B05B 11/00 222/1 |
| 8,014,789 | B2 * | 9/2011 | Breed ..................... B60C 11/24 455/456.1 |
| 8,177,096 | B2 * | 5/2012 | Macler ..................... B67B 7/28 222/105 |
| 8,382,913 | B2 * | 2/2013 | Classen ............... A47L 15/4454 134/58 D |
| 8,387,455 | B1 * | 3/2013 | Kaminski ............. G01F 23/266 73/304 C |
| 8,429,965 | B2 * | 4/2013 | Radhakrishnan ....... A47J 31/50 73/304 C |
| 8,464,584 | B2 * | 6/2013 | Lassota .................. G01F 23/24 73/304 R |
| 8,464,906 | B2 * | 6/2013 | Macler ..................... B67B 7/28 222/1 |
| 8,469,050 | B2 * | 6/2013 | King .................... A61M 1/0058 137/392 |
| 8,931,340 | B2 * | 1/2015 | Wiederkind-Klein ...................... G01F 23/268 73/304 C |
| 8,966,973 | B1 * | 3/2015 | Milone ................. G01F 23/268 73/304 C |
| 8,980,014 | B2 * | 3/2015 | Classen ............... A47L 15/4463 134/18 |
| 9,052,227 | B1 * | 6/2015 | Lassota ................ G01F 23/268 |
| 9,138,091 | B2 * | 9/2015 | Zhao ..................... A47G 23/16 |
| 9,153,119 | B2 * | 10/2015 | Stapleford ........... G08B 21/182 |
| 9,212,042 | B2 * | 12/2015 | Veltrop ................ B67D 3/0019 |
| 9,261,395 | B2 * | 2/2016 | Shearer ................ G01F 23/268 |
| 9,311,806 | B2 * | 4/2016 | Hazen .................. G08B 21/182 |
| 9,417,635 | B2 * | 8/2016 | Hampton ............. G01F 23/265 |
| 9,459,132 | B2 * | 10/2016 | Fehrenbach .......... G01F 23/296 |
| 9,476,752 | B2 * | 10/2016 | Vilag .................... B67D 7/3272 |
| 9,488,513 | B2 * | 11/2016 | Kumar .................... G01F 23/00 |
| 9,510,727 | B2 * | 12/2016 | Classen ............... A47L 15/4454 |
| 9,610,001 | B2 * | 4/2017 | Classen ............... A47L 15/0055 |
| 9,658,095 | B2 * | 5/2017 | Winkens ............... G01F 23/266 |
| 9,911,306 | B2 * | 3/2018 | Tshilombo ........... G08B 21/182 |
| 9,952,082 | B2 * | 4/2018 | Schwartz ................ G01F 23/26 |
| 10,114,139 | B1 * | 10/2018 | Mirisharif .............. G01F 22/00 |
| 2002/0020449 | A1 | 2/2002 | Imai |
| 2002/0145527 | A1 * | 10/2002 | Lassota .................. A47J 31/50 340/622 |
| 2002/0161652 | A1 | 10/2002 | Paullin et al. |
| 2004/0199131 | A1 * | 10/2004 | Kitamura ................. A61F 5/451 604/318 |
| 2005/0067434 | A1 * | 3/2005 | Yu ........................ B67D 3/0032 222/185.1 |
| 2008/0036615 | A1 * | 2/2008 | Lyall, III ............... G01K 13/00 340/614 |
| 2008/0277414 | A1 * | 11/2008 | Macler ..................... B67B 7/28 222/85 |

(56) References Cited

U.S. PATENT DOCUMENTS

| | | | |
|---|---|---|---|
| 2009/0031798 A1* | 2/2009 | Radhakrishnan | A47J 31/50 73/304 C |
| 2009/0158841 A1* | 6/2009 | Winkens | G01F 23/265 73/304 C |
| 2009/0187357 A1* | 7/2009 | Ho | G01F 23/266 702/52 |
| 2009/0212069 A1 | 8/2009 | Lassota et al. | |
| 2009/0294469 A1* | 12/2009 | Poulain | G01G 13/00 222/1 |
| 2010/0209313 A1* | 8/2010 | Davis | C02F 1/78 422/186.14 |
| 2011/0166699 A1* | 7/2011 | Palmquist | B67D 1/1234 700/236 |
| 2011/0265562 A1* | 11/2011 | Li | A47J 27/212 73/304 C |
| 2011/0314907 A1* | 12/2011 | Wiedekind-Klein | G01F 23/268 73/304 C |
| 2012/0193373 A1* | 8/2012 | Macler | B67B 7/28 222/85 |
| 2013/0276533 A1* | 10/2013 | Wilder | G01F 23/268 73/304 C |
| 2014/0014684 A1* | 1/2014 | Classen | A47L 15/4454 222/56 |
| 2014/0152323 A1* | 6/2014 | Kumar | G01F 23/00 324/658 |
| 2015/0021360 A1* | 1/2015 | Veltrop | B67D 3/0019 222/146.6 |
| 2015/0090625 A1* | 4/2015 | Bauss | B65D 23/08 206/459.5 |
| 2015/0122015 A1* | 5/2015 | Leppard | G01F 23/263 73/304 C |
| 2015/0129039 A1* | 5/2015 | Mulvaney | A47J 31/057 137/1 |
| 2015/0366411 A1* | 12/2015 | Yang | A47K 5/1217 222/25 |
| 2016/0007798 A1* | 1/2016 | Jimenez | A47J 31/56 99/281 |
| 2016/0047683 A1* | 2/2016 | Winkens | G01F 23/266 73/304 C |
| 2016/0230625 A1* | 8/2016 | Bradford | F01M 11/12 |
| 2016/0257554 A1* | 9/2016 | Manwani | B67D 3/0067 |
| 2017/0299416 A1* | 10/2017 | Rondano | G01F 23/263 |
| 2017/0299417 A1* | 10/2017 | Otagaki | G01F 23/265 |
| 2017/0328761 A1* | 11/2017 | Schwartz | G01F 23/266 |
| 2018/0099850 A1* | 4/2018 | Lyons | A45F 3/18 |
| 2018/0100754 A1* | 4/2018 | Kumar | G01F 23/268 |
| 2018/0132643 A1* | 5/2018 | Shklar | G01F 23/0061 |
| 2018/0266873 A1* | 9/2018 | Goodier | F01M 11/10 |
| 2018/0303271 A1* | 10/2018 | Glucksman | A47J 31/057 |
| 2018/0326661 A1* | 11/2018 | Johnson | B29C 64/259 |
| 2018/0344070 A1* | 12/2018 | Perrelli | B67D 1/0016 |
| 2019/0021529 A1* | 1/2019 | Schucker | A47G 19/2227 |

OTHER PUBLICATIONS

International Preliminary Report on Patentability, dated Nov. 5, 2019 for PCT/US2018/030987.

* cited by examiner

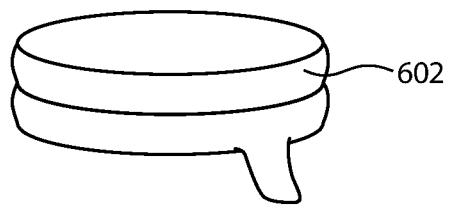
FIG. 6B
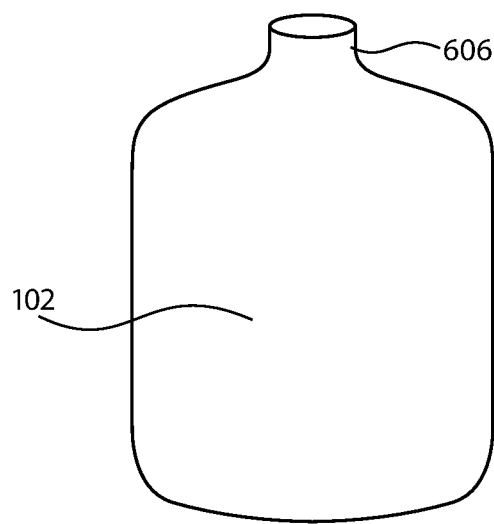
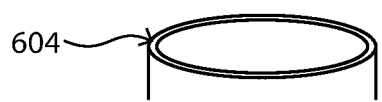
FIG. 6C
FIG. 6A

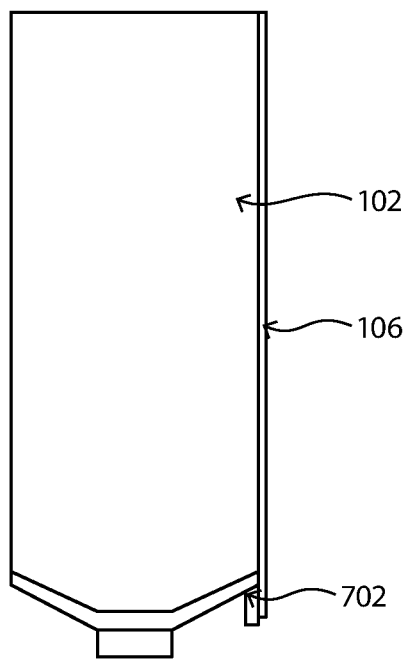 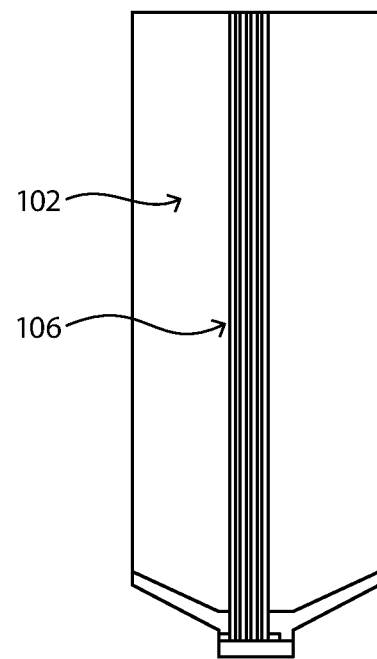
FIG. 7A  FIG. 7B

APPARATUS, SYSTEM, AND METHOD OF PROVIDING A LIQUID LEVEL MONITOR

CROSS REFERENCE TO RELATED APPLICATIONS

Field of the Disclosure

This application claims the benefit of priority to U.S. Provisional Application No. 62/500,916, filed on May 3, 2017, entitled "Apparatus, System and Method of Providing a Liquid Level Monitor", and U.S. Provisional Application No. 62/592,955, filed Nov. 30, 2017, entitled "Apparatus, System, and Method of Providing a Printed Authentication and Certification Functional Circuit", and U.S. Provisional Application No. 62/666,605, filed May 3, 2018, entitled: Apparatus, System, and Method of Providing a Solids Level Monitor" and U.S. Provisional Application No. 62/666,608, filed May 3, 2018, entitled "Apparatus, System and Method of Providing a Content Level Monitor, and the entireties of which is incorporated herein as if set forth in its entireties.

BACKGROUND

Field of the Disclosure

The disclosure relates generally to sensing, and, more particularly, to an apparatus, system, and method of monitoring liquid levels and indicating a need for replenishment.

Background of the Disclosure

It is well understood that various types of liquids carried within bottles or like containers are designed to be dispensed over extended time periods in discreet doses. By way of nonlimiting example, detergent for use in a washing machine is often provided in liquid form, and a large bottle, such as having a spigot or other output type to allow for the dispensing of the detergent outwardly from the bottle, enables dispensing of that dose of detergent into a load of laundry within the washer. Similarly, such as in an office environment, a large bottle is used to provide water at a "water cooler", and the water is dispensed responsive to independent actuations of a spigot.

However, in embodiments such as the aforementioned, it is often the case that the bottle is moderately heavy to very heavy in weight prior to its initial use, and that the only way for a user to monitor how much liquid remains in the bottle is to periodically shake, lift, or otherwise manipulate the bottle to allow for a qualified guess by the user as to how much liquid remains therein. Further, there is historically no methodology whereby proper dosing for use of the liquid, such as per load dosing into a washing machine, may be readily assessed. Unfortunately, in a washing machine embodiment, too little soap may cause an inadequate level of cleaning of clothes placed within the washing machine, and too much soap may cause over-sudsing, which may damage the washing machine or the laundry area. Yet further, there is presently no mechanism whereby a seller of a liquid, such as dishwashing or laundry detergent, or water cooler bottles, can assess a consumer's need for additional liquid.

Therefore, the need exists for an apparatus, system, and method of monitoring liquid levels within a consumable, such as a bottle, and of automatically indicating (herein referred to as "autoreplenishment"), such as to at least one of a consumer and a seller of liquids, when the need for additional liquid and/or a consumable containing it occurs.

SUMMARY

The embodiments are and include an apparatus, system and method for a liquid level monitoring dispenser for association with a liquid filled consumable. The apparatus, system and method may include: a receiver for receiving the consumable upon inversion thereof; at least one electrical contact within the receiver for communicative association with conductive strips on the consumable; a sensing module communicative with the at least one electrical contact and having associated therewith firmware for converting signals associated with the conductive strips and received at the electrical contact to an indication of the liquid level; a communications module for communicating the liquid level to at least a user display and over at least one network; a power module for powering at least the sensing module and the communications module; and at least one dispensing output in fluid communication with the consumable and capable of dispensing the liquid from the consumable to modify the liquid level.

Thus, the embodiments provide at least an apparatus, system, and method of monitoring liquid levels within a consumable, such as a bottle, and of automatically indicating (herein referred to as "autoreplenishment"), such as to at least one of a consumer and a seller of liquids, when the need for additional liquid and/or a consumable containing it occurs.

BRIEF DESCRIPTION OF THE DRAWINGS

The disclosure is illustrated by way of example and not limitation in the accompanying drawings, in which like references indicate similar elements, and in which:

FIGS. 6A, 6B and 6C illustrate exemplary aspects of a consumable;

FIGS. 7A and 7B illustrate exemplary aspects of a consumable;

DETAILED DESCRIPTION

Figure 1:
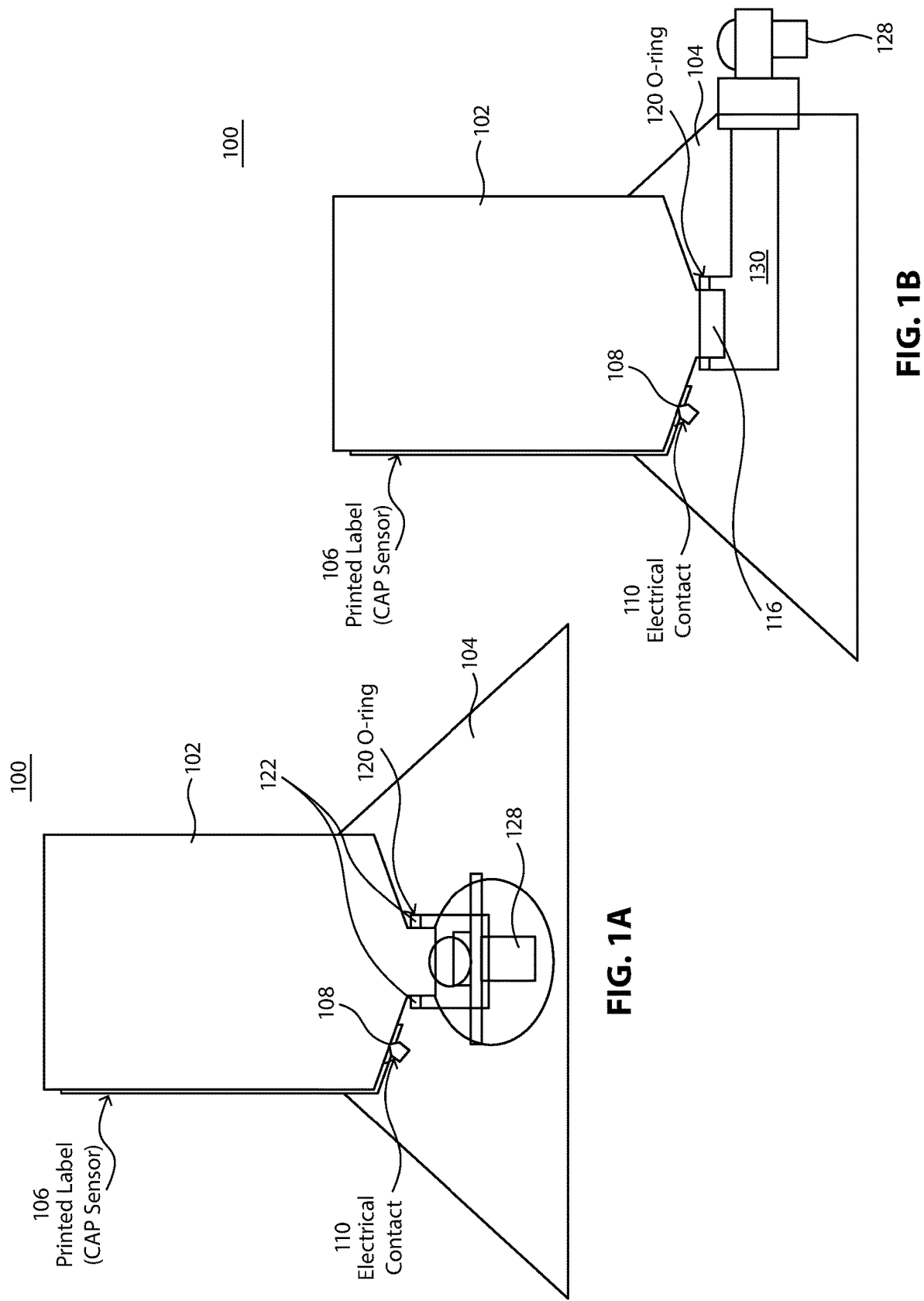
FIGS. 1A and 1B illustrate a front view and side view of a consumable and dispenser system.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide networked access to a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Furthermore, it will be understood that the term "module" as used herein does not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (which may work in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Embodiments may include a liquid level monitoring apparatus, system, and method, as well as an auto replenishment apparatus, system, and method for liquids typically contained within a consumable, such as a bottle, for which monitoring of the level of those liquids has not historically occurred. The embodiments may include a stand-alone dispenser, such as a base having a liquid output, that is distinct from the one or more liquid consumables, and which may include one or more printed circuit boards, firmware, network communication capabilities, user interfaces and indicators, provided power, and a spigot for dispensing liquid from a consumable associated with the dispenser. The embodiments of the dispenser may be associated with one or more consumables or similar packages, such as may be formed of plastic or glass, and which may have associated there with one or more electronic labels having capacitive sensing capabilities.

Further, included in the embodiments may be: cloud based storage and communication with one or more of the dispensers; one or more smartphone apps for communication with the one or more dispensers and/or the cloud based communication site; and an analytics dashboard, which may be app and/or web-based, such as may be used by a seller of the liquids. As used herein, a "liquid level" monitored in the disclosed apparatuses, systems and methods is indicative of the amount of liquid remaining in a consumable associated with aspects of the embodiments; a "dose" is an amount of liquid dispensed, such as from the liquid output/spigot, for a given purpose; and an "auto replenishment" may occur when the liquid level in the consumable reaches a point at which a reorder is required.

More particularly, a capacitive-sensing microprocessor, and the requisite processing power, may be resident in the durable dispenser. Because the capacitive sensing must sense liquid levels inside a consumable, the consumable may have associated there with, either aftermarket or following manufacture, and by direct printing or in-label, a smart label having conductive strips running substantially up the consumable on at least one side thereof. These conductive strips may become communicative with the capacitive sensing chip upon, and only upon, installation of the consumable into the durable dispenser. Needless to say, a snug electromechanical connection with the dispenser may be provided for the consumable, and/or for variably sized consumables, via any known method. This connection may occur only upon insertion of the consumable into the dispenser, such as by a spring-loaded connector that snugs around the bottleneck, and/or by using a keying mechanism, such as a slot, associated with the consumable/neck to ensure insertion of the consumable at a proper orientation into the dispenser to allow for an electromechanical connection, or using other like methods.

Thereby, the embodiments may provide a liquid sensing solution having a capacitive circuit on the consumable that "wakes up" only when the consumable is plugged into a durable, permanent or semi-permanent, dispenser. Moreover, the embodiments allow for enhanced convenience and control by the user, such as by communicatively associating with the circuitry referenced herein one or more apps having resident therein settings that may be adjusted by a user, such as for dosing of the liquid within the consumable. Further, the communication capabilities disclosed herein may allow for enhanced value to sellers, such as by increasing brand loyalty, reorder frequency, and by providing experiential use data, by way of non-limiting example. In turn, it will be understood in light of the disclosed embodiments that the value to a user may be further enhanced, such as by providing for the offering of discounts from a brand monitoring usage levels to a high-volume user, or the like.

The consumable disclosed in the embodiments may be of any suitable type to allow for reception by the durable dispenser. For example, the consumable may hold between 1 and 3 L, and/or between 1 and 5 gallons, of liquid, and may have a substantially or semi-cylindrical, rectangular, or like shape. The consumable may be of any color or composition that will allow for the conductive sensing discussed herein. The consumable may have associated therewith printed conductive strips that may extend substantially along the length/height of the consumable to allow for capacitive sensing, by way of non-limiting example. The strips may be pressure sensitive, and may be applied aftermarket or during the manufacturing and labeling process. These strips may electrically associate with electrodes in the dispenser in order to provide a signal or signals indicative of the requisite liquid level sensing.

The dispenser may include a dispenser, such as the aforementioned pouring spout, a spigot, pump, or the like, for the dispensing of the liquid from a consumable received into the dispenser. The dispenser may be, by way of non-limiting example, plastic in composition, and may be substantially injection molded, such as with one or more actuation elements, such as a handle, switch, button, or the like. The dispenser may include the aforementioned electrodes for associating with the conductive strips on the label physically present on the consumable associated with the dispenser. The dispenser may include one or more printed circuit boards having a connector to the electrodes suitable for receiving signals from the sensing strips on the consumable label; a capacitive sensor module; one or more indicator LEDs to indicate dosage and auto replenishment; one or more network communication capable modules, such as for communicating with a smart phone, local area network, cellular network, or the like; one or more power modules to provide power to the dispenser modules, and which may include batteries that may be permanent/semipermanent (i.e., rechargeable) or replaceable; and or other optional elements, such as one or more audio alarms to support or replace the LED indicators of correct dosage or auto replenishment.

Further included may be firmware and software to provide the functionality discussed throughout. For example, firmware may sense the liquid level based on the intercommunication of the capacitve sensing chip and the conductive strips, and may use this information to indicate dosing or auto replenishment. Likewise, dosing, and perhaps auto replenishment, may be information provided remotely from cloud-based algorithms to the firmware of the dispenser.

The disclosed communication capabilities may include communication with one or more smartphone apps having user information associated therewith, and which may receive user feedback regarding liquid levels, dosing, auto replenishments, and so on. Such a smart phone app may communicate with the dispenser via, for example, WiFi, Bluetooth, BLE, or cellular communication methodologies, and further, the firmware of the dispenser may be suitable to batch information and data and/or otherwise piggyback to a smart phone having resident thereon the referenced app.

Further, a cloud-based backend may store and serve received data to and from the aforementioned app, and to or from one or more web-based or app-based dashboards. Some or all of the additional processing discussed throughout may be performed at the cloud based backend, such as alerts or email confirmations in the circumstances of auto replenishment, such as instead of drawing on the limited resources of the dispenser's firmware or processors.

The aforementioned dashboard may be associated with one or more sellers or brands of the referenced liquids within the consumable. In such circumstances, an analytics dashboard may be available to the brand for user and use data indicative of certain geography use, global use, use at times of the day, use by demographic area, or the like. This and additional information provided at the dashboard may allow for a brand to target or otherwise send special offers, discount codes, or the like to particular users, such as high-volume users.

Various of the disclosed embodiments may have associated therewith one or more functional needs. By way of non-limiting example, mechanical and electromechanical functionality may include: dispensing of the liquid when the spout or similar output is held in the open position, without leaking in the open or closed position; placement of the spout or other output to enable dispensing of liquid "below level", such as into a pitcher or other large container; in the event replaceable, rather than rechargeable or permanent batteries are used, a battery compartment may be included to allow for periodic changing of the batteries, such as without special tools or the risk of breakage (for example, the battery compartment may open using a simple flat or Phillips' head screwdriver).

Of course, a key electro-mechanical functionality may include detection of the liquid level within the consumable. This may be done using the aforementioned capacitive sensing, such as via electrodes in the dispenser associated with a flexible circuit on the consumable. Similarly, a pressure sensitive label, having printed electrodes associated therewith, may be employed. In each such case, the sensing processor may preferably be included within the dispenser and connectively associated with the sensor elements of the consumable's label.

Other functional needs for certain of the embodiments may include, by way of non-limiting example, electrical and firmware needs. For example, the system may include network communications, such as to allow for communication of the liquid level to one or more smartphone apps as discussed above. This network communication functionality may be associated with a main printed circuit board resident within the dispenser, which printed circuit board is collectively associated with the sensing label on the consumable. Alternatively, the dispenser may include a dedicated network communications board. Further, communication methodologies may include BLE, Bluetooth, WiFi, cellular, and the like.

Further, the firmware of the dispenser may indicate when an adequate dose of liquid for a particular circumstance has been dispensed, i.e., a proper "dosage event". For example, the firmware of the printed circuit board may blink one or more LEDs for a proper dosage timeframe, or may audibly indicate, such as using a low-level buzzer, for the length of the dose or when a dose should be stopped. Dose size may be set up using the app or a web-based application, such as in small, medium, and large, increments, and those increments may be particularly associated, such as by a manufacturer's specifications, with a particular machine, such as a particular washing machine brand and model. Alternatively, dosing may be hard coded into the firmware, such as for a given consumable size typically received by the dispenser, such as a 32 ounce consumable.

Moreover, the firmware, such as absent intercommunication with the cloud or in association with cloud communication, may indicate and/or otherwise trigger an autoreplenishment event. This auto replenishment may be automatic or semi-automatic—a semi-automatic autoreplenishment event may show a confirmation dialogue or other alert to the user, such as in the app, which may allow for the user to cancel or confirm the order; or, the auto replenishment order may be fully automated. An autoreplenishment event may be communicated to the referenced cloud backend, such as subject to an additional confirmation, such as by an app alert or an email, to the ordering consumer. Further, such an auto replenishment event may contribute to the data that may be provided to a brand, such as on the brand dashboard. Data associated with an autoreplenishment may include date, time, location, and/or user ID of the app associated with the auto replenishment, percent liquid level (which may be automatic as an autoreplenishment threshold, or which may be set by the user), product SKU, or the like.

Functionality for the cloud may include storage of liquid level updates, dosage events, and auto replenishment events. Further, cloud functionality may include user activity data, interactivity, reset capability, and the like. Decisions, such as the reaching of thresholds for discounts, may optionally occur in the cloud, and the brand dashboard may be enabled to approve such discounts to send, such as for receipt by the consumer app, discount codes and/or other targeted advertising to select consumers. Select consumers may be particular consumers meeting certain data thresholds, classes of consumers, app profile information, or the like.

Auto replenishment events available in the dashboard may be provided in list, mapped, or threshold formats, by way of non-limiting example. Accessing an auto replenishment event may open a particular consumer profile, and may make available to the dashboard all data associated with that profile. Such data, which may be in a map form as referenced above, may include latitude, longitude, location, distance from nearest seller of the brand, use date, use time, percent liquid level, machine used with, and the like. Also included in the brand dashboard data may be typical frequency of use, recent frequency of use, time since last use, and so on.

In accordance with the foregoing, there may be numerous mechanical aspects of certain of the disclosed embodiments. For example, one mechanical aspect may include the consumable. The consumable is associated with a custom, electronically functional, pressure sensitive and/or capacitive label. The label may include printed conductive strips that are suitable for electrical connection to the printed circuit board in the dispenser. The label and/or the bottleneck may additionally include one or more insertion mechanisms to allow for insertion of the consumable having the label thereon into the dispenser, such as positional guides, latches, keys, or the like.

Mechanical aspects of the dispenser may include one or more outputs, such as a spigot. The dispenser may be substantially closed so as to avoid leakage or shock, and may allow for the spigot to hang over the edge of a level surface to enable filling of larger containers. Further, the dispenser may be suitable to receive the consumable when the consumable is inverted and placed top side down into the dispenser. As such and in certain embodiments, the consumable may have associated therewith features to simplify interaction with the dispenser. For example, the consumable may be provided with a plastic top cap over the opening of the consumable, and a foil seal under the plastic top cap over the opening. Thereby, the plastic cap may be removed and the consumable inverted and placed into the dispenser, and the dispenser may include an element to pierce the foil seal to allow the liquid to be released into the dispenser.

Also relevant to the embodiments may be several electrical aspects. For example, the conductive strips of the consumable label are associated with the electronics in the dispenser, as referenced throughout. This may occur, for example, by the inclusion of a tab along the neck of the consumable, wherein the conductive strips are associated with the tab and the tab inserts into a slot within the dispenser when the consumable is inverted and placed onto the dispenser. Further included within the dispenser is the referenced capacitive sensor module which interacts with the conductive strips of the label.

Also associated with the dispenser and/or with one or more printed circuit boards therein may be a communication chip or module, such as a BLE or Bluetooth chip/module. This communication module may have associated there with an antenna, such as a printed circuit board trace antenna, to enable network communication from the dispenser. The dispenser may additionally include one or more processors, which may include or be in addition to the network communications chipset and/or the capacitive sensing chipset/module. Also included within the dispenser may be power for the foregoing, such as one or more replaceable batteries, such as coin batteries, AA batteries, or AAA batteries, by way of non-limiting example.

The electrical aspects of the dispenser may include, as referenced throughout, one or more printed circuit boards. Such printed circuit boards may be or include a two-sided board having a 1.6 mm thickness, 1 ounce copper, and Nickel-Gold ENIG finish, by way of non-limiting example. The printed circuit board may have, electrically associated therewith, one or more indicators, such as one or more LED and/or one or more audible indicators.

Firmware aspects of certain of the embodiments may include liquid level sensing algorithms. Further, the liquid level sensing may include interference avoidance techniques to maintain sensing accuracy, such even if a user touches the conduct of strips of the label or the dispenser. Further included within the firmware may be the ability to define and communicate this liquid level sensing. For example, network communications, such as BLE communications, may be included in, or otherwise controlled by, the firmware. As such, the dispenser may be discoverable by a smart phone app, and pairing between the dispenser and the smartphone app may occur. Thereby, liquid level sensed updates may be communicated from the dispenser to the smart phone at appropriate or requested intervals.

The firmware may additionally exchange messages regarding dosing events. For example, the firmware may receive a dosing event indication from the user, the smartphone, or a sensor, and may accordingly blink an LED or activate a buzzer to indicate proper dosing. This dosing may comprise a message uploaded to the firmware, such as wherein the dosing is defined either in the cloud or in the app settings by a user. Yet further, autoreplenishment indications to be generated from the firmware may comprise intelligence within the user app or within the cloud backend. Accordingly, network communications may be triggered by changes in liquid level (such as continuously or periodically), the need for auto replenishment, or the like, and hence communications may occur on fixed time intervals, continuously, or at intervals of variable frequency.

In accordance with the foregoing, the user app may additionally include various aspects. For example, the smart phone at may be enabled to discover and pair with the firmware of the dispenser, such as when the dispenser is activated or on, as mentioned above. The smart phone app may display autoreplenishment requests or confirmation, such as in a user dialogue format. Further, the smart phone app may display a current liquid level, and the frequency of updates for the liquid level. Also indicated may be proper dosing and the ability for the user to request dosing.

The app may additionally include the capability to receive discounts and targeted advertising, such as from the brand dashboard. These may be in the form of a push notification or a user dialogue that provides an app alert to accept and/or apply the discount code, such as wherein the discount code may be saved for the next order or applied to a current order. Of course, the app may include the ability to change any one or more of the foregoing settings or any additional settings, such as autoreplenishment settings, such as wherein the liquid level percentage threshold may be varied for an autoreplenishment indication. The app may also allow for changes in dosage settings, machine type, such as washing machine brand and model, liquid dispensing models and machine types, and the receipt of or application of discount codes, and so on. The foregoing may be available from a drop-down or similar menu, a pop-up window, or via any known user interaction, by way of example.

The dashboard referenced herein may additionally include particular aspects. For example, the dashboard may include autoreplenishment event data, particular user information, location-based information, and the like. Further, the dashboard may integrate third-party data, such as weather data, to allow for data fusion between sensed data and publicly available data sources, such as in order to optimize sales.

The dashboard may also include one or more search capabilities. That is, a dashboard user may search for particular data across one or more users, such as "frequent users", "fading users" (i.e., a list of users whose frequency of use has fallen relative to long-term usage), certain geographic searches, usage associated with certain events (such as snowstorms), and the like. Responsive to the search, and otherwise available from within the dashboard, may be a consumer data display. That is, dashboard events, such as autoreplenishment events, may include drill down capabilities to obtain more detail on particular consumers. The drill down may include basic information, such as delivery address or locale, and more particular information, such as dosing events or liquid levels over time.

The dashboard requirements may additionally include an ability to design marketing campaigns and/or discount codes. For example, discount codes may be provided based on the meeting of certain thresholds by certain data of consumers. Thereby, the discount codes may be automatically generated upon the trigger event for one or more consumers, or may be "hard entered" by a person controlling the dashboard. Moreover, the foregoing aspects may overlap, such as wherein discount codes are readily executed, such as responsive to a single click, to all consumers that have been returned responsive to an entered search within the dashboard.

Additional functional requirements may include those of the cloud based backend. The cloud based backend may store data, including autoreplenishment events, dosing events, and liquid level events, by way of example, and may be suitable to serve that data back to the smart phone app and/or to the dashboard as needed. Further, certain of the decision-making algorithms discussed herein throughout may also reside at the cloud based backend, such as rather than residing in a smart phone app or in association with the dashboard.

FIGS. 1A and 1B illustrate front and side views, respectively, of a system 100 in which a consumable 102 is associated with a dispenser 104 according to the embodiments. As illustrated, a printed sensing label 106 may be associated with one side of the consumable along its length, and may terminate in an electrical "tab" 108 that, upon association of the consumable 102 with the dispenser 104, electrically connects to an electrical contact 110 in the permanent dispenser. The electrical contact shown may be at a single or multiple positions within the dispenser, such that the need may or may not exist to align the conductive strips 106 with the electrical contact 110 upon insertion of the consumable 102 in order to complete the sensing circuit.

Also as shown, the neck and/or cap portion 116 of the consumable 102 may pass through a leak seal 120 upon association with the dispenser 104, such that liquid within the consumable cannot spill out and overflow the sides of the receiving portion of the dispenser. The leak seal 120 may take the form of an o-ring within the dispenser receiving portion, by way of non-limiting example. Further illustrated in FIG. 1 is a mechanical adjustment 122, such as a spring-loaded orifice, that may snug the neck of the consumable, once inserted through the leak seal 120, into the dispenser 104, such as to further prevent leaks and provide support to hold up the consumable 102.

Also illustrated in association with the dispenser is a liquid output 128, such as a spigot. Of note, the spigot shown is in fluid communication with a fluid pathway 130 that begins on the side of the o-ring/leak preventer 120 opposite the body of the consumable 102, and that terminates on the input side of the spigot. Of note and as will be evident from the illustration of FIG. 1, the gravitational pull on the liquid provides sufficient downward force/head pressure so that the liquid enters the fluid pathway for output at the spigot.

Figure 2:
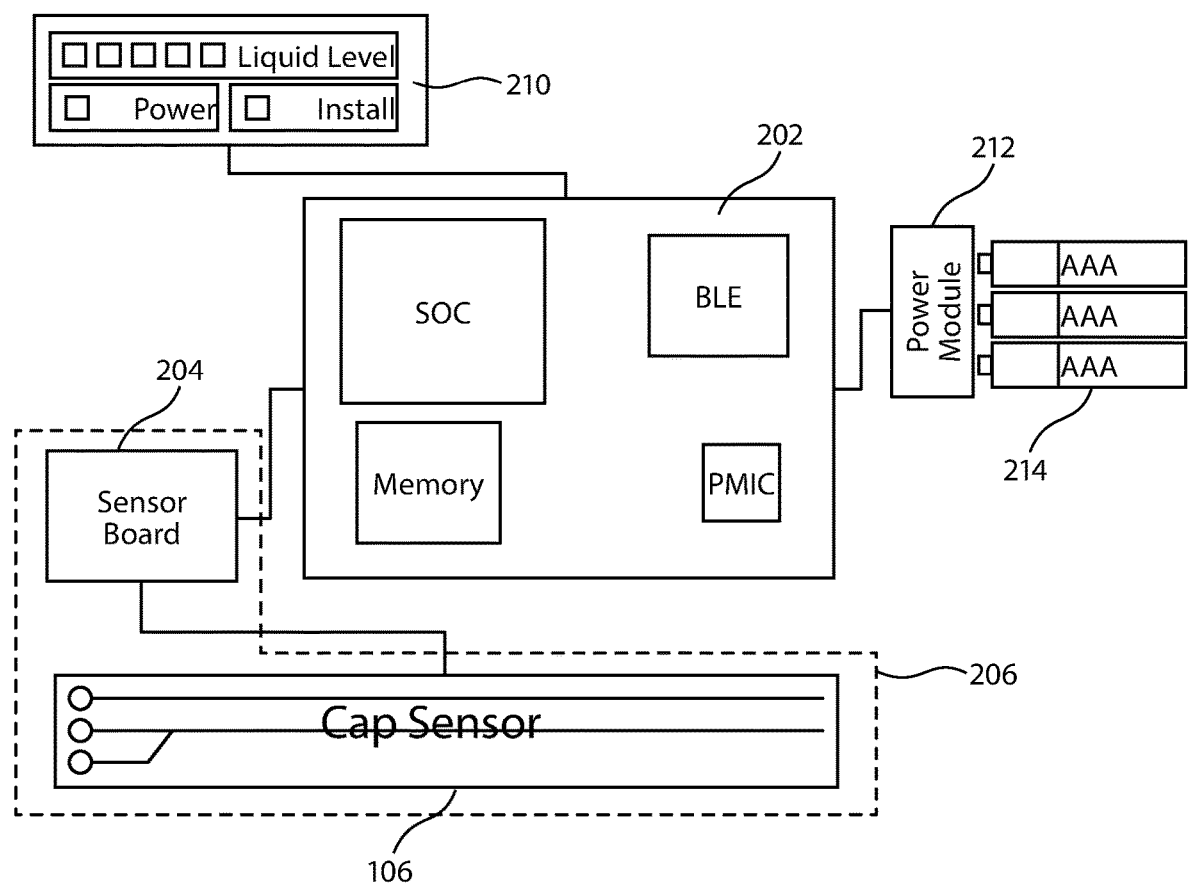
FIG. 2 illustrates an exemplary electrical block for use with a dispenser.

FIG. 2 illustrates an exemplary "electrical block" 200 that may be included in association with the aforementioned dispenser 104. Within the electrical block are illustrated a main printed circuit board 202, which may include, by way of nonlimiting example, processing, memory, and/or network communication capabilities; a sensor board 204 that may electrically associate with the conductive strips 106 of the consumable label to form a capacitive or like-sensing circuit 206; a display module 210, whereby liquid levels, power, or the replenishment, or the like may be indicated to the user; and a power module 212 that powers the electrical block and which may have associated therewith one or more batteries 214. Of note, firmware, running in association with the main printed circuit board 202 and/or with the display module 210 may apply one or more algorithms to use the available indicators, such as the LED lights and/or audio indicators, in different manners in order to indicate different functionality, such as varying lighting, beeps, or the like to indicate different states of the liquid levels and/or dosing to a user.

Figure 3:
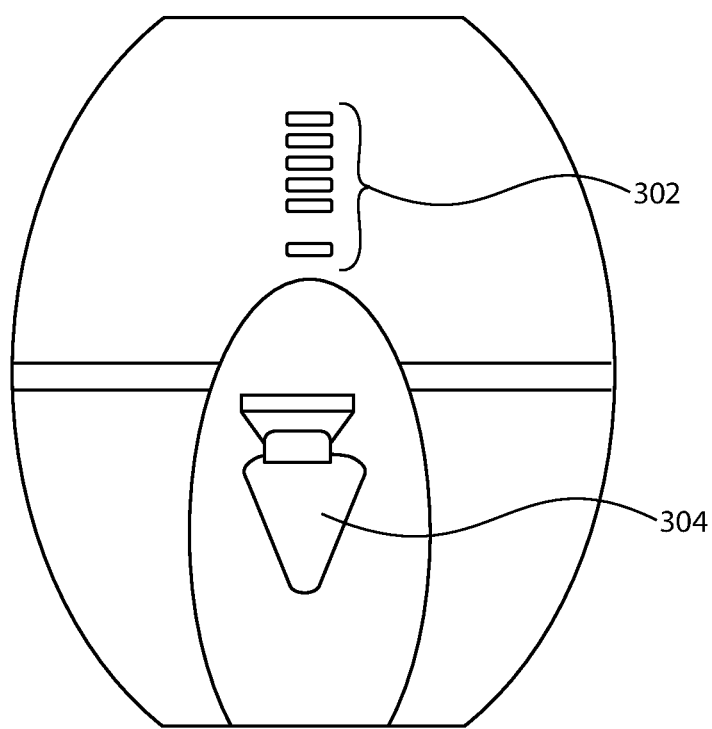
FIG. 3 illustrates an exemplary dispenser.
Figure 4:
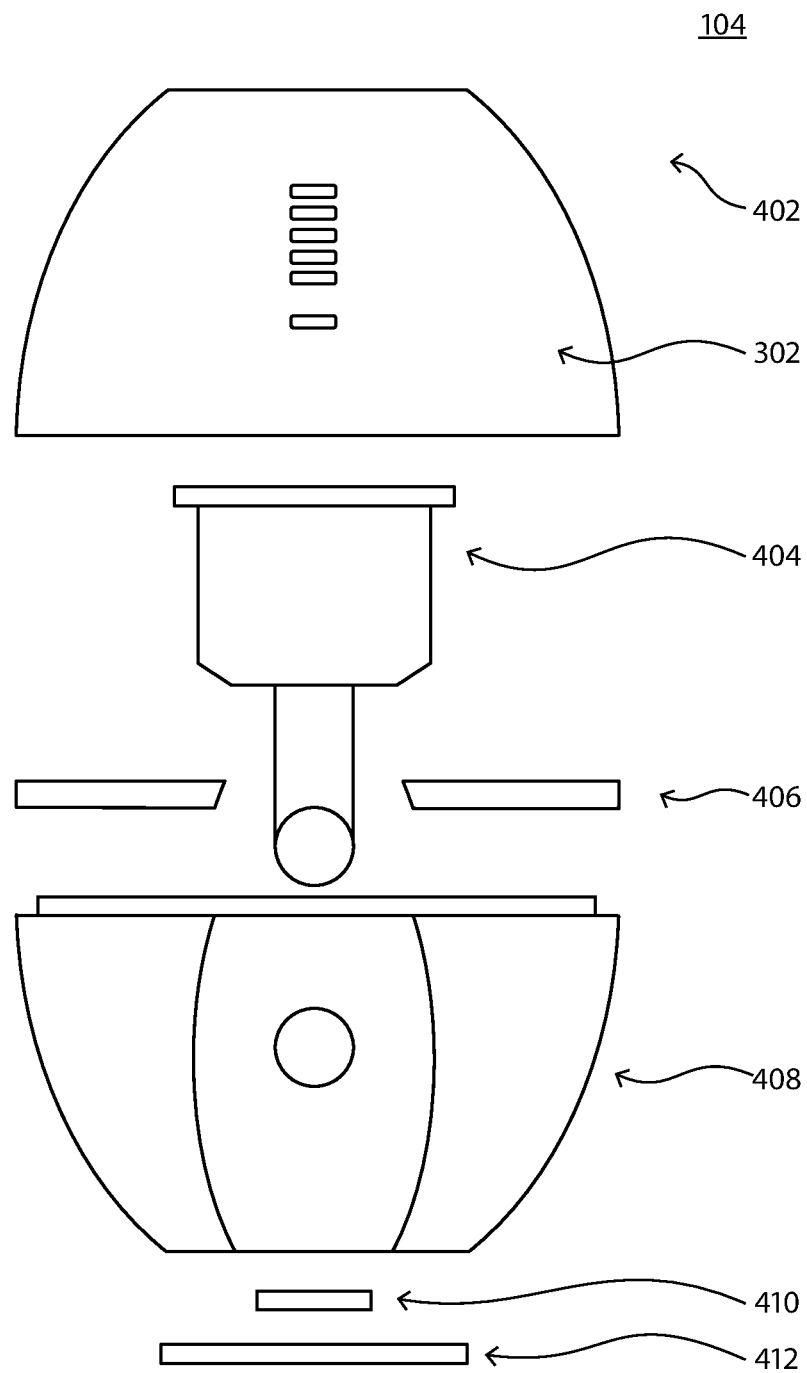
FIG. 4 illustrates an exemplary dispenser.

FIG. 3 illustrates a particular exemplary embodiment of a dispenser 104 having associated therewith 6 LED indicators 302 and a push button spigot 304. As further indicated in the breakout view illustrated in FIG. 4, the dispenser 104 may include a top cover 402, which may include lighting or other indicators 302; a middle frame 404, such as to provide structural support and at least a portion of the fluid pathway 130 for receiving the consumable cap and neck; a sealing ring 406, such as in order to prevent leakage from a consumable placed within the dispenser 104; and a bottom cover 408, such as may include a battery compartment door 410 for insertion of power/batteries, and a stability enhancer 412, such as a rubber pad, legs, or the like to enhance stability of the dispenser.

Figure 5A:
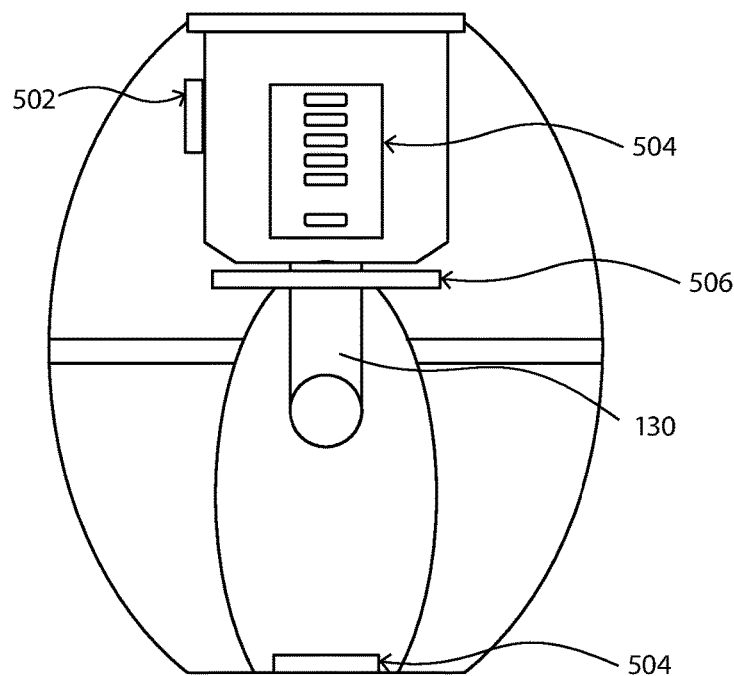
FIGS. 5A and 5B illustrate a front view and a top view of a cross section of an exemplary dispenser.
Figure 5B:
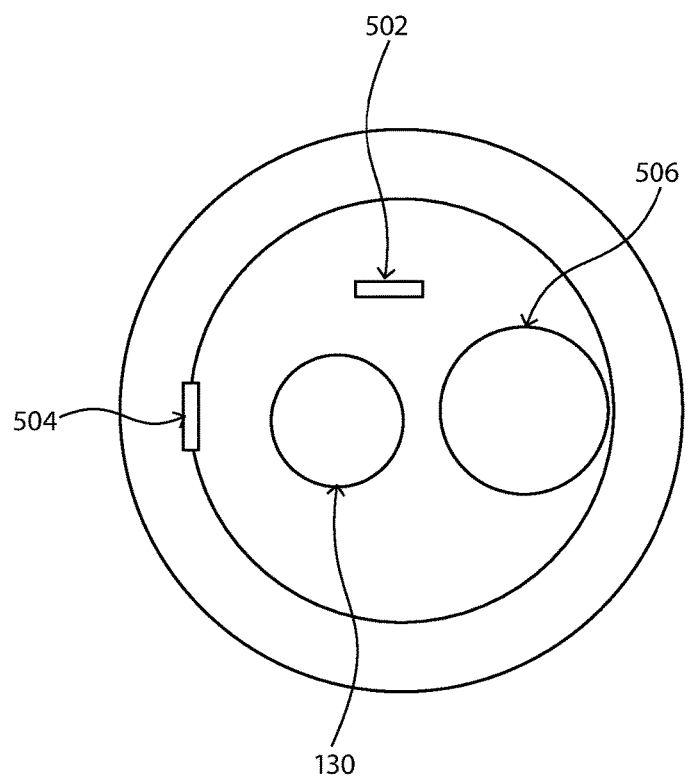

FIGS. 5A and 5B illustrate a front view and top view, respectively, of cross-sections of an exemplary dispenser 104. As illustrated, the top most portion of the dispenser may include a sensor board 502, a display board 504, a main PCB board 506, and so on. Further illustrated is a portion of the aforementioned fluid pathway 130. The bottom portion of the dispenser may include one or more power modules 510, such as may include one or more batteries and battery compartments.

FIG. 6 illustrates a consumable 102, such as is referenced throughout. FIG. 6A illustrates a typical 5 gallon water cooler consumable 102. FIG. 6B illustrates a plastic top cap 602 that may typically associated with such a water consumable 102, and FIG. 6C illustrates a foil barrier 604 that may be associated with the upper neck/cap portion 606 of the watercooler consumable 102, and which is visible only after removal of the plastic top cap 602. Of note, the consumable of FIG. 6A may be inverted after removal of the plastic top cap 602 and inserted into the dispenser 104 discussed throughout. Upon such an insertion, the foil barrier 604 of FIG. 6C may be pierced, and liquid may flow through the fluid pathway 130 to provide availability of the liquid at the spigot of the dispenser 104. Of note, the foil or like-cover of FIG. 6C may have associated therewith an electronic identification, such that, before or after piercing, the dispenser may "read" the type of consumable and other consumable-related information, such as the manufacturer of the consumable, the capacity of the consumable, the composition of the contents of the consumable, and so on.

Figures at 7A and 7B illustrate an exemplary sensor strip 106 as may be associated with the label of a consumable 102. FIG. 7A illustrates a front view, and FIG. 7B a side view, of an embodiment having a plurality of sensing strips 106 that extend into a tab 702, wherein the tab may be inserted into/onto the electrical contact 110 portion of the dispenser, such as the electrical contact illustrated in FIGS. 1A and 1B.

Figure 8:
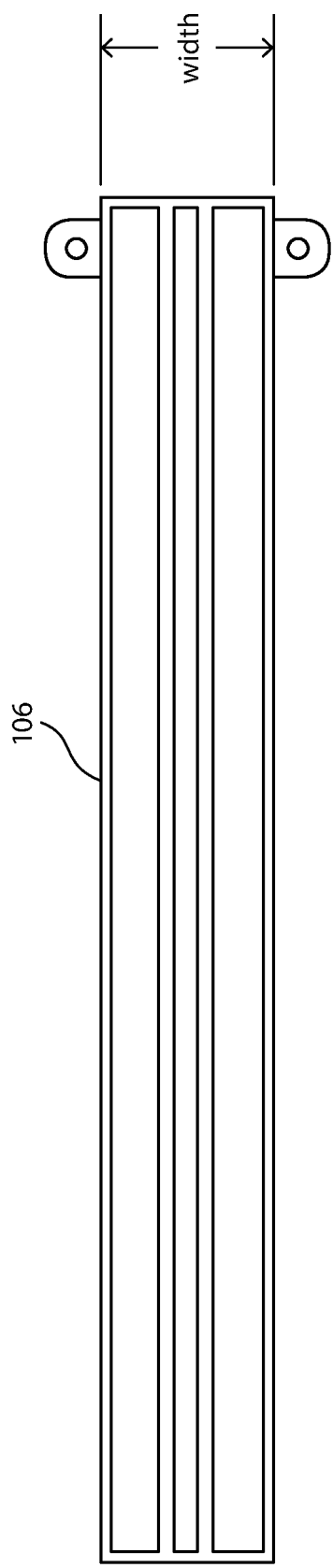
FIG. 8 illustrates exemplary conductive strips for use in the embodiments.

FIG. 8 illustrates an exemplary one of the sensor/conductive strips 106 for association with a consumable 102 and/or a consumable label. These strips 106 may have any dimensions suitable for association with or within the label, and suitable for forming full electrical contact with an aspect of the dispenser. By way of nonlimiting example, these sensing strips may have a length substantially equivalent to the full length of the consumable, and may have a width of, by way of nonlimiting example, 10 to 30 mm, or 20 mm.

Figure 9:
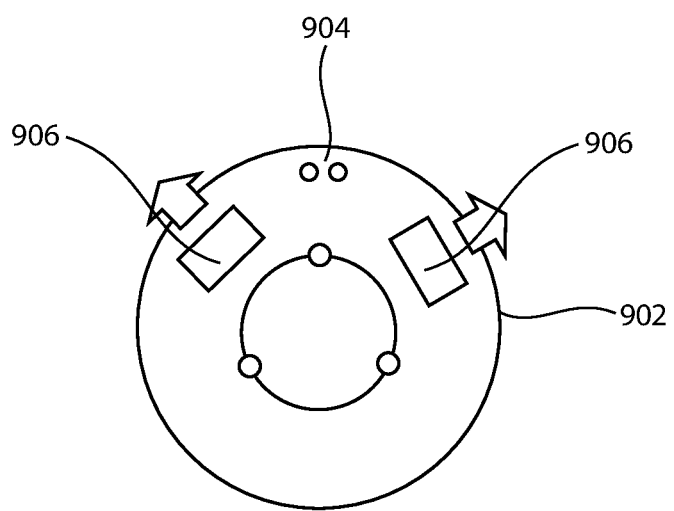
FIG. 9 illustrates an exemplary printed circuit board.

FIG. 9 shows an exemplary embodiment of a main PCB board 902. Of note, an exemplary PCB board 902 such as the one shown may have a circular form, such as with an outer diameter of approximately 35 mm. Further, an exemplary thickness of the PCB may be approximately 1 mm. The main PCB board shown 902, by way of nonlimiting example only, includes receptivity to power 904, and one or more flex connectors 906, such as may be associated with an electrical contact 110, such as an electrical slot for receiving a conductive strip tab as discussed throughout.

Figure 10:
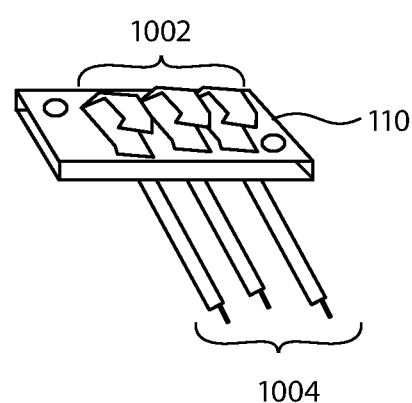
FIG. 10 illustrates an exemplary electrical contact.

By way of nonlimiting example, FIG. 10 illustrates an exemplary electrical contact 110 that may be located within a slot for reception of the conductive strip, tab, or the like which may be resident within that portion of the dispenser 104 receives the neck of the consumable. As shown, the electrical contact may have a number of spring contacts 1002 commensurate with the number of conductive strips 106 associated with the bottle label, and these electrical contacts 1002 may create an electromagnetic field around the conductive strips 106, for which the rate of oscillation is indicative of liquid levels. These oscillating current levels may be passed electrically down the wires 1004 from the electrical contact 110 to, for example, the sensing module, such that this electrical signal information may be processed into a liquid level indication.

Figure 11A:
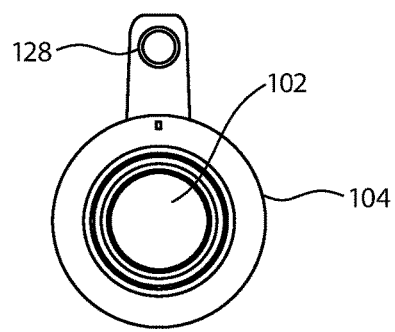
FIGS. 11A, 11B, 11C, 11D, and 11E illustrates exemplary aspects in various views of a consumable and a dispenser.
Figure 11B:
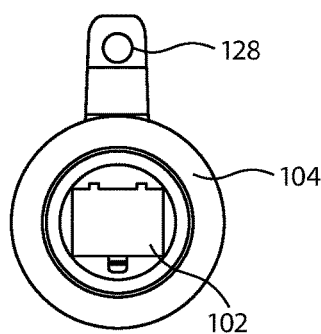
Figure 11C:
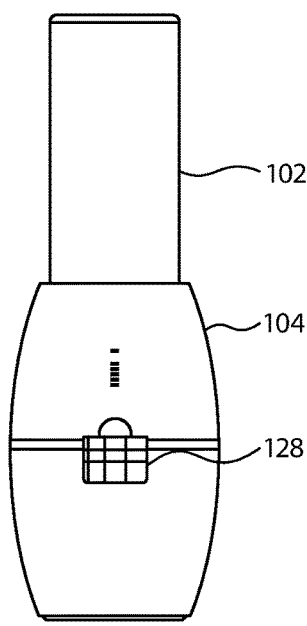
Figure 11D:
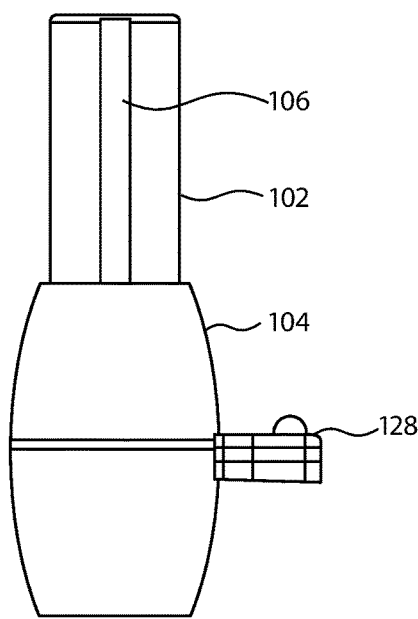
Figure 11E:
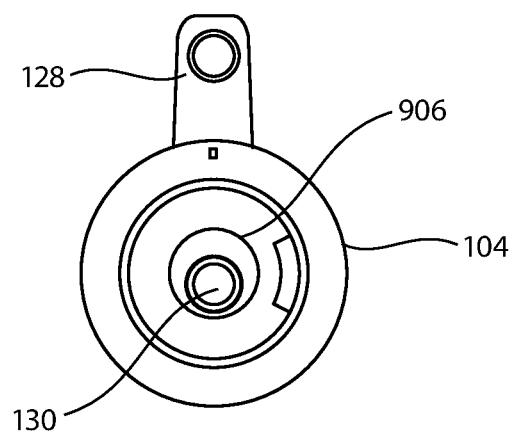

FIGS. 11A, 11B, 11C, 11D, and 11E illustrate a dispenser 104, and FIGS. 11A, 11C and 11D illustrate a consumable 102 associated with the dispenser 104. The conductive strips 106 that may form part of the capacitive sensing module 206 are shown in FIG. 11D. More particularly, Figure A illustrates a top view of the dispenser 104 with a consumable 102 inserted. FIG. 11B illustrates a bottom in view of the dispenser 104, with a door 1102 leading to the battery compartment, and with a spigot 128 evident at the top most portion thereof. FIG. 11E illustrates the portion of the dispenser 104 that is receptive to the bottleneck and consumable cap portion, but without the consumable 102 inserted therein. Evident in FIG. 11E is the o-ring 128 to prevent leaks, and the entrance to the fluid pathway 130 into which the liquid will be dispensed upon inverted insertion of the consumable 102 into the dispenser 104.

Figure 12:
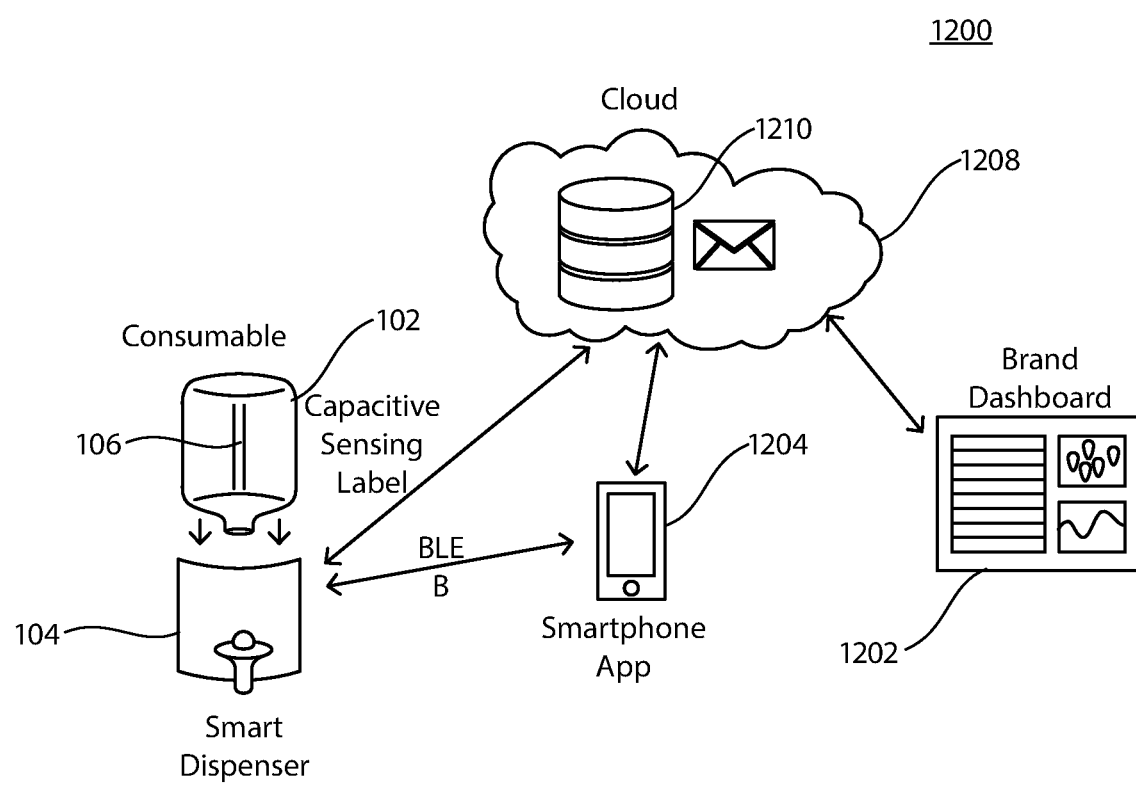
FIG. 12 illustrates an exemplary cloud-based system.

FIG. 12 illustrates a system 1200 in which the dashboard 1202 and smartphone app 1204 discussed herein throughout may be included. As shown, a consumable consumable 102 having associated there with conductive strips 106 is inserted into a smart dispenser 104. The illustrated dispenser 104 is then suitable to communicate with a smartphone app 1204 to exchange the information discussed throughout. The smartphone app 1204 may then communicate with the cloud 1208, although it should be noted that the smart dispenser 104 may additionally or alternatively communicate directly with the cloud 1208, such as via a Wi-Fi network. The cloud based backend 1210 may then communicate with the smartphone app 1204 and with the brand dashboard 1202, as discussed herein throughout.

In the foregoing Detailed Description, it can be seen that various features are grouped together in a single embodiment for the purpose of streamlining the disclosure. This method of disclosure is not to be interpreted as reflecting an intention that the embodiments require more features than are expressly recited herein.

What is claimed is:

1. A liquid level monitoring dispenser for association with a liquid filled consumable, comprising:
 a receiver for receiving the consumable upon inversion thereof;
 at least one flexible electrical connector at least partially around a first internal circumference within the receiver for communicative association with printed conductive strips within product labeling of the consumable, the first internal circumference being sufficiently far along an exit flow pathway of the liquid so as to prevent leakage of the liquid but positioned so as to be capable of contacting the printed conductive strips, and the flexible electrical connector being suitable for the communicative association with the printed conductive strips at multiple rotational and angular insertion positions of the consumable;

a sensing module within the receiver communicative with the at least one flexible electrical connector and having associated therewith firmware for converting signals associated with the conductive strips, as actuated by the sensing module and responsively received at the flexible electrical connector, to an indication of the liquid level, and further capable of sensing a foil cap associated with the consumable, wherein the sensing of the foil cap is indicative of characteristics of the consumable;

a communications module for communicating the liquid level and the characteristics to at least a user display and over at least one network;

a power module for powering at least the sensing module and the communications module; and at least one dispensing output in fluid communication with the consumable and capable of dispensing the liquid from the consumable to modify the liquid level.

2. The dispenser of claim 1, wherein the receiver comprises a leak seal.

3. The dispenser of claim 2, wherein the leak seal comprises an o-ring.

4. The dispenser of claim 1, wherein the receiver is cone-shaped and the consumable is a bottle.

5. The dispenser of claim 1, wherein the liquid level is additionally communicated to a consumable provider by the communications module.

6. The dispenser of claim 5, wherein, upon a predetermined level of the liquid level, the consumable provider provides an automatic replenishment of the liquid.

7. The dispenser of claim 1, further comprising an app integrated to the communications module.

8. The dispenser of claim 1, wherein the at least one dispensing output comprises a spigot.

9. The dispenser of claim 1, wherein the conductive strips are printed.

10. The dispenser of claim 1, wherein the conductive strips comprise one or more tabs for electrical association with the at least one flexible electrical connector.

11. The dispenser of claim 1, further comprising a mechanical adjustment to snug the consumable to the receiver.

12. The dispenser of claim 11, wherein the mechanical adjustment is spring-loaded.

13. The dispenser of claim 1, wherein the conductive strips comprise capacitive sensors.

14. The dispenser of claim 1, wherein the sensor module comprises a sensor printed circuit board.

15. The dispenser of claim 1, further comprising a liquid level indicator.

16. The dispenser of claim 15, wherein the liquid level indicator comprises LED lights.

17. The dispenser of claim 1, further comprising a dosage indicator.

18. The dispenser of claim 17, wherein the dosage indicator comprises LED lights.

19. The dispenser of claim 1, wherein the power module comprises at least one battery.

* * * * *